3,538,157
PROCESS FOR HYDROLYZING FLUORODIAZA-
DIENES AND PRODUCTS THEREFROM
Paul H. Ogden, Oakdale Township, Washington County,
Minn., assignor to Minnesota Mining and Manufacturing Company, St. Paul, Minn., a corporation of Delaware
No Drawing. Filed Apr. 3, 1967, Ser. No. 627,609
Int. Cl. C07c *103/32*
U.S. Cl. 260—561       10 Claims

ABSTRACT OF THE DISCLOSURE

This invention relates to a novel process for hydrolyzing fluorodiazadienes and to the novel perfluoroamide moiety-containing products produced therefrom.

CROSS REFERENCES

My copending application, U.S. Ser. No. 562,540, filed July 5, 1966, and U.S. Ser. No. 627,607, filed on even date herewith, teach starting materials useful in the practice of this invention.

BACKGROUND

In spite of continuously increasing technical interest in highly fluorinated organic materials there are very few references in the available technical literature to perfluoro (N-substituted alkylamines) which contain a hydrogen atom bound to the nitrogen atom. Only a few such materials have been described, namely N,N-bis(trifluoromethyl) amine, $CF_3$—NH—$CF_3$ [Barr and Haszeldine, J. Chem. Soc., 2532 (1955); Young, Tsoukalis, and Dresdner, J. Amer. Chem. Soc., 80, 3604 (1958)] and 1H-decafluoropiperidine,

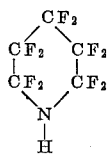

[Banks, Cheng, and Haszeldine, J. Chem. Soc., 2458 (1964)]; and compounds disclosed by Pearlson and Hals in U.S. Pat. No. 2,643,267. All of these compounds decompose in the presence of water.

Although N-perfluoroalkyl substituted ureas and urethanes have been reported [Dannley and Yamashire, J. Org. Chem., 27,599 (1962) and references therein], these compounds are not completely fluorinated and contain a hydrocarbon moiety. They are prepared by the condensation of a fluoroalkyl isocyanate and either an alcohol or an amine. For instance, N-(perfluoro-n-propyl)-N'-phenylurea, $C_3F_7NHCONHC_6H_5$, is prepared from perfluoro-n-propylisocyanate $C_3F_7$—NCO and aniline $C_6H_5NH_2$. These compounds are unstable. They decompose spontaneously at room temperature and react vigorously in the presence of water.

In those cases which have been reported, the result of hydrolysis of a terminal azomethine containing the —N=$CF_2$ moiety involves initial conversion of the perfluoroazomethine group (—N=$CF_2$) to an isocyanate group (—N=C=O), with a subsequent hydrolysis to a nitrile, a carboxylic acid amide, or the ammonium salt of a carboxylic acid. Similarly, perfluoroazaalkenes in which the CF=N bond is not terminal have been reported to yield perfluorocarboxylic acids upon hydrolysis. As far as is known, no one has heretofore isolated or identified perfluoro(alkylamides).

SUMMARY

It has now been discovered that certain perfluorodiazadienes can be controllably hydrolyzed to produce a new class of compounds, namely perfluoro(alkylamides), which are represented by the formula:

(1)     $R_fNHCO-Z$ (1A)    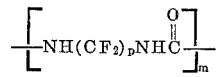

where Z is selected from the group of monovalent radicals consisting of $R_f'CO$—, $R_f'NHCO$—, and $R_f'NH$—where $R_f$ and $R_f'$ are each a fluoroaliphatic radical or $R_f$ and $R_f'$ together can form part of a fluoroalicyclic ring containing 5 members which contains both carbon and nitrogen, $p$ is an integer between about 4 and about 20, and $m$ represents an integer from about 5 through 100.

In the radical of Formula 1, the fluoroaliphatic radical is a fluorinated aliphatic radical containing at least one carbon atom in the skeletal chain. The chain may be straight, branched, or cyclic, and may be interrupted by divalent oxygen atoms or divalent sulphur atoms. Preferably, such skeletal chain does not contain more than one oxygen or sulphur atom for every two carbon atoms in the skeletal chain. It is preferred to have only fluorine present as substituents to satisfy non-skeletal valences. Preferably, such fluoroaliphatic radical contains less than about 20 carbon atoms in its skeletal chain.

Preferably, $R_f$ is a lower perfluoroalkyl radical or a portion of a perfluorinated heterocyclic ring which contains both at least one carbon atom adjacent to the amide nitrogen atom shown in Formula 1, and one —NH-group, said heterocyclic ring preferably containing 5 members.

The term "lower" as used herein refers to a radical containing less than 7 carbon atoms (i.e., from 1 to 6).

Such starting perfluorodiazadienes each contain two occurrences of the moiety

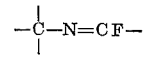

the dangling valences of each such moiety each being satisfied by a member of the group consisting of fluorine, chlorine, perfluoroalkyl, perfluoroalkylene, perfluorochloroalkylene, and perfluoroazaalkylene. Preferably, such starting perfluorodiazadienes contain less than 30 carbon atoms each. Preferred classes of perfluorodiazadiene starting materials are characterized by the following generic formulas:

(2)    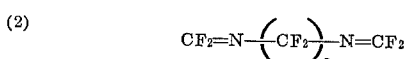

(3)    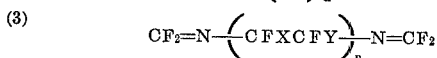

(4)    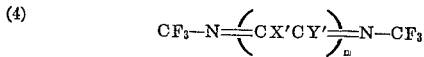

where X and Y are each fluorine, or a lower perfluoroalkyl group, X' and Y' are each fluorine or a lower perfluoroalkyl group, and $n$ represents an integer between 1 and about 20, inclusive.

The compounds of Formulas 2 and 3 may be prepared by the ultraviolet photolysis of perfluoro-2,3-diazabuta-1,3-diene and either a fluorinated olefin or a source of perfluorinated carbene, such as difluorocarbene (copending U.S. patent application S.N. 562,540).

The compounds of Formula 4 are made by the isomerization of compounds of Formulas 1 and 2 by methods taught by my copending U.S. patent application Ser. No. 627,607, filed on even date herewith.

The controlled hydrolysis of the starting compounds of Formulas 2, 3, and 4, in accordance with the present invention, is carried out by maintaining such compounds in contact with stoichiometric or excess amounts of water for a length of time which is sufficient to convert substantially all of the azomethine groups thereof into perfluoro-(alkylamide) groups of Formula 1 as illustrated by the following Equations 5, 6, and 7:

(5)

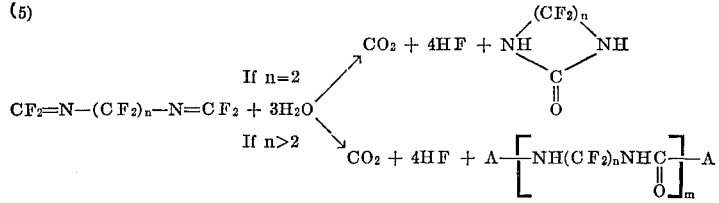

$$CF_2=N-(CF_2)_n-N=CF_2 + 3H_2O$$

where X is as defined above, $n$ is as defined above, $m$ represents an integer from about 5 through 100, and A is a terminal group which is a hydrolysis residue from the terminal azomethine groups, for example, a carboxyl or carboxylic acid amide. In some instances, such as when X and Y are fluorine, compounds of Formula 4 may be formed in situ during hydrolysis of the compounds of Formulas 2 and 3, thence producing the novel products of this invention. The following equation illustrates the in situ formation of compounds of Formula 4 where $n$ is 2 or more:

(6)

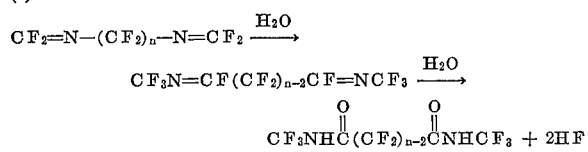

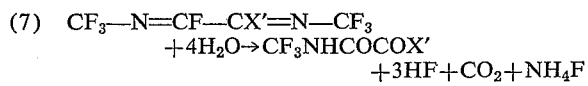

In compounds of Formula 4 where X' is perfluoroalkyl and Y' is fluorine, the hydrolysis reaction occurs as shown below:

(7) $CF_3-N=CF-CX'=N-CF_3$
$+4H_2O \rightarrow CF_3NHCOCOX'$
$+3HF+CO_2+NH_4F$

Although such hydrolyses can be carried out in basic environment, that is, an environment wherein the pH is greater than 7, (i.e. which is not strongly basic), the yield of perfluoro(alkylamide) product is reduced in such instances, presumably due to decomposition, as, for example, by further hydrolysis of products. Therefore, a pH of about 7 or below is preferred in practicing the hydrolysis teachings of this invention. While the hydrolysis reaction can be carried out with the diazadiene starting material present primarily in the gas phase, it is preferred to use the liquid phase, and it is more preferred to use an organic mutual solvent in which both water and starting diazadiene are soluble. Such mutual solvent should be inert towards the diazadiene, i.e., it should be free of reactive groups such as active hydrogen, and free of hydrolyzable groups such as esters, acyl halides, and the like. Suitable solvents include ketones, such as acetone or methyl ethyl ketone. Since the products of this invention are characteristically stable to acid or neutral hydrolysis, excess water may be used.

While preferred temperatures range from about 5 to 100° C., it will be appreciated that the exact reaction temperature used in any given situation is not critical. Thus, for example, lower temperatures may be used with longer reaction times.

The hydrolysis reaction can be conveniently monitored by examining the infrared spectra of the volatile materials since the perfluoro(alkylamide) products of this invention are solids of low vapor pressure at room temperature. Solvents and starting materials, which are volatile, may be removed by evaporation. The desired products may be separated by crystallization or sublimation.

Depending upon selection of starting material, one obtains different products which are either cyclic or acyclic.

When the compound of Formula 2 in which $n=1$ is hydrolyzed in accordance with the invention, there is produced a compound of the formula:

(8a)      $CF_3NHCONHCF_3$

The compound of Formula 8 can be termed perfluoro-(N,N'-dimethylurea). This compound is a white solid which sublimes at 100° C. under atmospheric pressure, and is soluble in common organic solvents such as acetone and ethanol.

The compound of Formula 8 is useful as a nuclear magnetic resonance spectral reference compound because it produces a well-defined $F^{19}$ doublet in polar solvents such as acetone. This compound also displays herbicidal activity, especially against green foxtail grass.

When compounds of Formula 2 in which $n$ is greater than 3 are hydrolyzed by water under acid or neutral conditions there are produced polymeric compounds characterizable by the following generic formula:

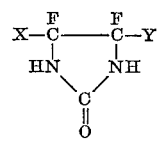

wherein $p$ is an integer between about 4 and 20, $m$ is an integer between about 5 and 100, and A is a residue from the hydrolysis of a terminal azomethine group, e.g., carboxyl, carboxylic acid amide, nitrile, or the like.

Compounds of Formula 8a may be termed poly(perfluoroureas). Such compounds are generally white, insoluble, high melting solids. They are generally moldable, castable, thermoplastic solids which may be formed into desired predetermined shapes.

When a compound of Formula 3 is hydrolyzed in accordance with this invention, there is produced a compound characterized by the generic formula:

(9)

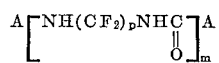

wherein X and Y are each as defined above.

These compounds of Formula 9 can be termed perfluoro(4,5-substituted-2-imidazolidones). Preferred compounds of Formula 9 are those where X is fluorine and Y is a lower perfluoroalkyl radical. Formula 9 compounds are characteristically white solids solublein common organic solvents, such as acetone and slightly soluble in water. These compounds are characteristically thermally and hydrolytically stable under ambient conditions. They are characteristically recovered unchanged after sublimation.

The compounds of Formula 9 are useful as cloth-treating agents since when deposited on cloth they impart water-repelling properties to cloth fibers containing reactive hydrogen atoms, such as, cellulose (cotton) fibers or protein (wool) fibers.

When a compound of Formula 4 wherein X and Y are each fluorine is hydrolyzed in accordance with the invention, there is produced a compound characterized by the formula:

(10)      $CF_3NH(CO)_2NHCF_3$

The compound of Formula 10 can be termed perfluoro-(N,N'-dimethyloxamide). This compound is a white solid which sublimes readily at 105° C. and is soluble in common organic solvents such as acetone and ethyl acetate.

The compound of Formula 10 is useful as a chemical intermediate to produce known products. Thus, it can be hydrolyzed in acidic aqueous solution to produce oxalic acid.

When a compound of Formula 4, wherein X' is fluorine, Y' is a lower perfluoroalkyl radical, and $n$ is one, is hydrolyzed in accordance with this invention, there is produced a compound characterized by the generic formula:

(11)    CF₃NHCOCOY″ wherein Y″ is a lower perfluoroalkyl radical.

The compounds of Formula 11 can be termed perfluoro (α-keto-N-methylamides). Compounds of Formula 11 are characteristically white solids which are soluble in acetone, ethanol, and ethyl acetate. They may be characteristically recovered unchanged after sublimation.

The compounds of Formula 11 form stable hydrates when treated with excess water. Such hydrates are characterized by the generic formula:

(12)
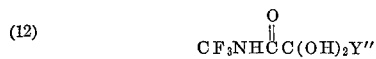
CF₃NHCC(OH)₂Y″ where Y″ is a lower perfluoroalkyl group as defined above.

The compounds of Formula 12 can be termed perfluoro (N-methyl-α,α-dihydroxyalkylamides). A preferred compound of Formula 12 is perfluoro(N-methyl-α,α-dihydroxy-propionamide). The compounds are characteristically white solids which sublime readily and are soluble in water and common organic solvents, such as ethanol and methyl ethyl ketone.

Characteristic of perfluoro-gem-diols, the compounds of Formula 12 are useful as solvents for polymers, such as polyamides, e.g., polycaprolactam; polyalcohols, e.g., polyvinyl alcohol; and polyesters.

When a compound of Formula 4 is hydrolyzed wherein X' and Y' are each a lower perfluoroalkyl radical, there is produced a compound characterized by the generic formula:

(13)    X″COCOY″ wherein X″ and Y″ are each a lower perfluoroalkyl radical as defined above.

The compounds of Formula 13 can be termed perfluoro (vic-diketones).

Formula 13 compounds are known and do not form part of the novel products of this invention.

The invention is illustrated in greater detail by the following examples. In all cases, the products described are purified either by crystallization from acetone or by sublimation or by both.

EXAMPLE 1

Perfluoro-2,4-diazapenta-1,4-diene,

CF₂=N—CF₂—N=CF₂

(0.5 g.) is condensed under vacuum at —196° C. into a Pyrex glass bulb which contains 5 cc. of water. After warming to room temperature the bulb and its contents are allowed to stand for 24 hours. The white solid which deposits is then filtered off, washed with a small quantity of water and after purification is identified by its elemental analysis as perfluoro(N,N'-dimethylurea),

CF₃NHCONHCF₃

The yield is approximately 0.2 g. (~40%).

*Analysis.*—Calcd. for C₃H₂F₆N₂O (percent): C, 18.4; H, 1.0; N, 14.3. Found (percent): C, 19.0; H, 1.2; N, 14.3.

The structure of the product is confirmed by its F¹⁹ n.m.r. spectrum which contains a doublet (J=3.3 cps.) at 56.2 φ* [see G. Filipovich and G. V. D. Tiers, J. Phys. Chem., 63, 761 (1959)] and its infrared spectrum which shows absorptions at 3.01μ and 6.2μ corresponding to the NH bonds and 5.89μ corresponding to the carbonyl bond.

EXAMPLE 2

The process of Example 1 is repeated using perfluoro-2,5-diazahexa - 2,4 - diene, CF₃—N=CF—CF=N—CF₃. The white solid which is recovered is purified and identified by its elemental analysis as perfluoro(N,N'-dimethyloxamide), CF₃NHCOCONHCF₃.

The yield is approximately 60% of theoretical.

*Analysis.*—Calcd. for C₄H₂F₈N₂O₂ (percent): C, 21.4; H, 0.9; N, 12.5. Found (percent): C, 21.5; H, 0.9; N, 12.5.

The structure of the product is confirmed by its F¹⁹ n.m.r. spectrum which shows a doublet (J=3.3 cps.) at 57.7 φ* and its infrared spectrum which shows absorptions at 3.56μ and 6.65μ corresponding to the NH bonds and 5.80μ corresponding to the carbonyl bond.

EXAMPLE 3

The process of Example 1 is repeated using perfluoro-2,5 - diazahexa-1,5-diene, CF₂=N—CF₂—CF₂—N=CF₂. Perfluoro (N,N'-dimethyloxamide) (approximately 20% of theoretical) is obtained together with a small quantity of a solid which is appreciably more soluble in water. This solid is identified by its F¹⁹ n.m.r. and infrared spectrum as perfluoro-2-imidazolidone,

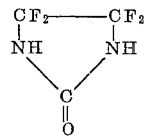

Its F¹⁹ n.m.r. spectrum shows a signal at 94 φ* corresponding to —CF₂— and its infrared spectrum shows absorptions at 3.1μ and 5.7μ corresponding to the NH bonds and carbonyl bond, respectively.

EXAMPLE 4

The process of Example 1 is repeated using perfluoro-(3-methyl-2,5-diazahexa-1,5-diene),

CF₂=N—CF₂—CF(CF₃)—N=CF₂

After purification the white solid product is identified by its elemental analysis as perfluoro(4-methyl-2-imidazolidone),

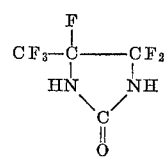

The yield is about 40% theory.

*Analysis.*—Calcd. for C₄H₂F₆N₂O (percent): C, 23.1; H, 1.0; N, 13.5. Found (percent): C, 23.1; H, 1.0; N, 12.8.

The structure of the product is confirmed by its F¹⁹ n.m.r. spectrum which shows a complex doublet (J=13.9 cps.) at 79.3 φ* corresponding to the CF₃ group, a complex peak at 134.8 φ* corresponding to the —CF group, and an AB pattern (J=188 cps.) at 84.6 and 91.3 φ* corresponding to the CF₂ group, and by its infrared spectrum which shows absorptions at 3.09μ and 3.1μ corresponding to the NH bonds and at 5.65μ corresponding to the carbonyl bond.

EXAMPLE 5

Perfluoro - 2,3 - diazabuta-1,3-diene (1 part) and tetrafluoroethylene (10 parts) are photolyzed together for 5 hours in a silica tube using a BH-6 lamp, at room temperature. A white solid is produced which is shown by its infrared spectrum to have the characteristic structure CF₂=N—(CF₂)ₙ—N=CF₂ where the value of $n$ is about 20. This material is then hydrolzed with water to produce a white, insoluble high-melting solid which is identified as a polyperfluorourea by its infrared spectrum. The terminal groups of this polymer are adventitious hydrolysis products of terminal azomethine groups or terminal methylimino groups. After prolonged heating with 40% alcoholic sodium hydroxide solution, this material is converted into the sodium salt of a high-molecular weight fluorinated carboxylic acid which is identified as such by its characteristic infrared spectrum.

EXAMPLE 6

The process of Example 1 is repeated using perfluoro-(3-methyl-2,5-diazahexa-2,4-diene), $$CF_3-N=CF_2-C(CF_3)=N-CF_3$$

The product, which is obtained in about 70% theoretical yield is identified as perfluoro(N-methyl-α,α-dihydroxypropionamide), $CF_3-NH-CO-C(OH)_2-CF_3$, by its elemental analysis.

*Analysis.*—Calcd. for $C_4H_3F_6NO_3$ (percent): C, 21.2; H, 1.3; N, 6.2. Found (percent): C, 21.1; H, 1.3; N, 6.3.

The structure of the compound is confirmed by its $F^{19}$ n.m.r. spectrum which shows a doublet (J=3.2 cps.) at 57.8φ* corresponding to $CF_3$—NH and a single peak at 83.3φ* corresponding to $CF_3$—CO—, and by its infrared spectrum which shows absorptions at 2.98μ and 3.84μ corresponding to the NH or OH bonds, at 6.45μ corresponding to the NH bond and at 5.77 corresponding to the >CO bond.

I claim:

1. A process comprising contacting a perfluorodiazadiene with water having a pH not substantially above 7, and recovering the resulting amide product, said perfluorodiazadiene having the generic formula $$CF_3-N=CXCY=N-CF_3$$

where X and Y are fluorine or lower perfluoroalkyl.

2. The process of claim 1 wherein the perfluorodiazadiene has the generic formula $$CF_3-N=CX'CY'=N-CF_3$$

where X' and Y' are each selected from the group consisting of fluorine and perfluoromethyl.

3. The process of claim 1 wherein the contacting is done in the additional presence of an organic solvent for said perfluorodiazadiene, said solvent being miscible with water.

4. The process of claim 1 wherein said amide has a formula $$R_fNHCO-Z$$

where Z is selected from the group consisting of $R_f'CO$ and $R_f'NHCO$, where $R_f$ and $R_f'$ are each lower perfluoroalkyl.

5. A perfluoroalkylamide of the structure $$R_fNHCO-Z$$

where Z is selected from the group consisting of $R_f'CO$— and $R_f'NHCO$, where $R_f$ and $R_f'$ are each lower perfluoroalkyl.

6. Perfluoro(N,N'-dimethyloxamide).

7. A compound of the formula

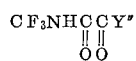

where Y" is a lower perfluoroalkyl radical.

8. Perfluoro(N-methylpyruvamide).

9. A compound of the formula

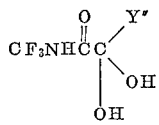

where Y" is a lower perfluoroalkyl group.

10. Perfluoro(N - methyl - α,α - dihydroxypropionamide).

References Cited

UNITED STATES PATENTS 3,404,162  10/1968  Selman _____ 260—340.2

ALEX MAZEL, Primary Examiner

J. A. NARCAVAGE, Assistant Examiner

U.S. Cl. X.R.

71—119; 117—135.5; 260—75, 77.5, 309.7, 553, 566

UNITED STATES PATENT OFFICE
CERTIFICATE OF CORRECTION

Patent No. 3,538,157          Dated November 3, 1970

Inventor(s) Paul H. Ogden

It is certified that error appears in the above-identified patent and that said Letters Patent are hereby corrected as shown below:

Col. 1, line 20 "application" should read -- applications -

Col. 4, line 4 "(8a)" should read -- (8) --.

Col. 4, line 30 the formula should be identified as -- (8a)

Col. 7, line 9 the formula should read

-- $CF_3-N=CF-C(CF_3)=N-CF_3$ --

SIGNED AND SEALED
FEB 9 1971

(SEAL)
Attest:

Edward M. Fletcher, Jr.
Attesting Officer

WILLIAM E. SCHUYLER, JR.
Commissioner of Patents